Nov. 6, 1962    H. P. FURGAL ETAL    3,062,663
FOOD PACKAGE
Filed Nov. 24, 1958
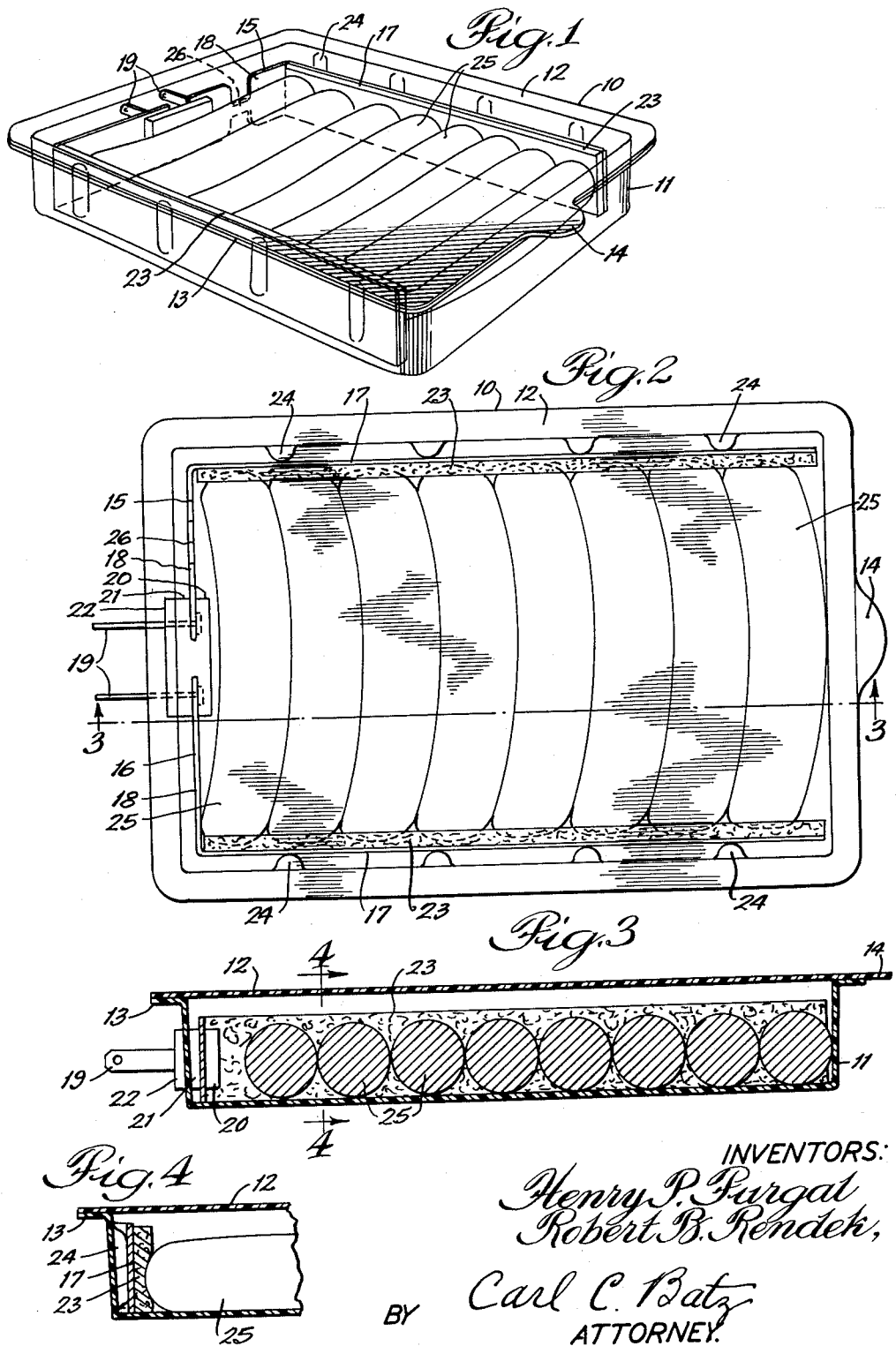
INVENTORS:
Henry P. Furgal
Robert B. Rendek,
BY Carl C. Batz
ATTORNEY.

United States Patent Office 3,062,663
Patented Nov. 6, 1962

3,062,663
FOOD PACKAGE
Henry P. Furgal, Highland Park, and Robert B. Rendek, Chicago, Ill., assignors, by mesne assignments, to Armour and Company, Chicago, Ill., a corporation of Delaware
Filed Nov. 24, 1958, Ser. No. 776,054
7 Claims. (Cl. 99—171)

This invention relates to a food package, and more specifically, to a package containing a food product which may be electrically heated therein to a preselected serving temperature.

Efforts have been made in recent years to develop inexpensive, disposable containers or wrappers equipped with electrical resistance heating elements so that food products packaged therein may be electrically heated to serving temperatures, thereby dispensing with the use of ranges and conventional cooking equipment in the preparation for the serving of such products. However, these efforts have been largely unsuccessful because, among other things, special equipment has been considered necessary for connecting such a package to a source of electricity and for supporting and insulating the package as the food is electrically heated therein. While the expense and the installation or placement of such equipment might not present serious problems in certain instances, as where the package-supporting and electrical connecting mechanism constitutes part of a commercial food vending machine, it is apparent that these factors nevertheless severely limit the marketability and greatly offset the advantages of food packages having self-contained heating means.

Accordingly, it is an object of the present invention to provide a food package which may be readily connected to a conventional electrical outlet or to an extension thereof for the heating of food contained therein, the package requiring no special equipment for its support, insulation, or electrical attachment. In this connection, it is an object to provide a food package having a sufficiently low external surface temperature to permit handling by a housewife or other user even when the contents thereof have been electrically heated to serving temperatures. Another object is to provide an inexpensive and disposable container adapted to enclose a food product for the marketing, storing and electrical heating of that product, the container being provided with means for connecting the same to a source of electric current and for automatically interrupting the electrical heating of the product when a serving temperature has been reached.

Other objects will appear from the specification and drawings in which:

FIGURE 1 is a perspective view of a package embodying the present invention;
FIGURE 2 is a top plan view of the food package shown in FIGURE 1;
FIGURE 3 is a longitudinal vertical section of the package taken along line 3—3 of FIGURE 2; and
FIGURE 4 is a fragmentary vertical cross-section taken along line 4—4 of FIGURE 3.

In the embodiment shown in the drawings, the numeral 10 generally designates a container having a body portion 11 and a cover 12. The illustrated container is rectangular in shape and is formed from transparent and non-conducting polystyrene. However, it is to be understood that other shapes may be provided and that the container may be formed from other materials, such as paper, which have similar non-conducting or electrical insulating properties.

In the illustration given, the container body is provided along its upper edge with a continuous and outwardly projecting peripheral flange 13. Cover 12 has its underside in surface contact with this flange and is perimetrically secured thereto by heat sealing or by any other suitable means. If desired, the cover may be provided with a flap or tab 14 so that the seal between the parts may be easily broken and the cover may be readily removed when the food product within the container is ready to be served.

Within the sealed container are a pair of electrodes 15 and 16. As shown in FIGURES 1 and 2, the electrodes have side portions 17 which extend in parallel and in longitudinally-spaced relation along opposite sides of the container and also have end portions 18 which extend inwardly toward each other adjacent one of the container's end walls. The inturned end portions 17 provide prongs 19 projecting outwardly through an end wall of the container body for insertion into the openings of an electrical receptacle. Plate members 20, 21 and 22 reinforce the prongs and the wall portion of the container adjacent thereto, and frictionally anchor the prongs in operative positions. In addition, the innermost member 20 prevents direct contact between a food product within the container and the inner ends of the prongs or the portions of the electrodes adjacent thereto. The elements 20, 21 and 22 may be formed from lucite or from any other suitable electrical insulating material.

The electrodes 15 and 16 are formed from a material of high conductivity and low electrical resistance. The electrodes may either be formed of solid metal, or they may consist of a laminate such as, for example, an aluminum foil secured to a paper or plastic backing strip. As a result, the strip electrodes are adapted to transmit electric current directly to a food product disposed within the container without becoming significantly heated by the flow of electricity therethrough. While a number of materials having the desired characteristics might be used, such as stainless steel, copper, or copper alloys, it has been found that aluminum is particularly suitable for this purpose.

As shown most clearly in FIGURES 2 and 4, the spaced parallel portions of the paired electrodes are provided along their opposing surfaces with resilient pads 23. In the present embodiment, these pads are formed from a porous cellulose sponge material saturated with an electrolytic solution such as brine which renders the pads electrically conducting. Gelatin, alginate and other sponge-like substances may also be used to form the moisture-retaining pads. By reason of their resilient character, the electrolytic pads are capable of accommodating size differences and size changes in solid food products while at the same time insuring proper electrical contact therewith at all times during a food heating operation.

The outer side portions 17 of the electrodes are in lateral surface contact with the side walls of the container body so that outward lateral movement of those electrode portions is prevented. If desired, the container's side walls may be provided with inwardly projecting ribs 24 which make limited surface contact with the electrodes and which thereby limit the extent of heat transfer between the surface engaging parts.

Within the container is a food product which, in the illustrated embodiment, consists of a group of frankfurters 25. Each of the frankfurters extends across the container and has its opposite ends snugly disposed against the resilient side pads or cushions 23. Thus, the frankfurters bridge the electrodes 15 and 16 and constitute the primary resistance elements for the electrical circuit.

While frankfurters are shown in the drawings, it is to be understood that other suitable foods or food products may be packaged within the container. Precooked frankfurters are particularly suitable because of their moisture content and their homogeneous quality. However, other types of precooked sausages and meats, as well as various other items such as soups and stews, might be similarly packaged. It is necessary only that the food item be electrically conductive, have an electrical resistance substantially greater than the resistance of the electrodes, be of such a composition that a generally uniform flow of current through the entire product is possible, and be ready for consumption upon reaching a preselected serving temperature.

Since the resistance component of the circuit is the food product itself, and since the electrodes are of relatively low resistance, electrical heating initiates in the food product rather than in the electrodes or other parts of the container. While some heat transfer from the food to the container is to be expected during a heating operation, the container tends to remain relatively cool because of its heat insulating properties. Even when the food has been fully heated and the package is ready to be opened, the container walls are of a sufficiently low temperature to permit direct handling of the package by a housewife or other user.

To prepare a heated, ready-to-serve food product, a user simply inserts the prongs of the package into any convenient electrical outlet, such as the outlet frequently found on the back panel of a kitchen range or the receptacle of an ordinary extension cord, and waits until the food product is electrically heated to serving temperature. Only a few minutes at most, will be required. For example, it has been found that in a container equipped with stainless steel electrodes, frankfurters or pork and beef sausage may be heated from a temperature of 40° F. to 150° F. in about 90 seconds. After the serving temperature has been reached, the package is disconnected, the heated food product is removed from the container, and the empty container is discarded.

To prevent electrical heating of the product beyond a suitable serving temperature, we provide at least one of the electrodes with circuit breaking means. In the illustration given, electrode 15 has a constricted portion 26 formed from a low melting electrical resistance alloy. Since such alloys are well-known in the art, a detailed discussion of their various compositions and properties is believed unnecessary herein. Depending largely upon the character of the food packaged within the container, the melting temperature of the fusible alloy, and hence the serving temperature of the food product, should be at some point within the range of about 140 to 160° F. In the case of frankfurters, a serving temperature of about 150° is preferred.

The melting of fuse portion 26 results from a change in the density of the current as the food product becomes heated. More specifically, the electrical resistance of the product decreases as it approaches serving temperature, thereby causing a proportional increase in the current flow until the fuse portion finally melts and breaks the circuit.

As already noted, an important aspect of the present food package lies in the fact that the food product itself is the heating element of the electrical circuit. Since the electrodes are of relatively low resistance and do not constitute heating elements for the transmission of heat to the food, the insulated package does not require a special holder or supporting device while in operation. As a result, the package is well adapted for home use and for use in any suitable location where a conventional electrical outlet can be found.

While in the foregoing we have disclosed an embodiment of the invention in considerable detail for purposes of illustration, it will be understood by those skilled in the art that many of these details may be varied widely without departing from the spirit and scope of the invention.

We claim:

1. A sealed food package comprising a container formed from an electrically non-conductive material, a pair of low resistance strip electrodes in spaced apart relation within said container, said electrodes having portions thereof projecting through a wall of said container to provide prongs for insertion into an electrical outlet, and an electrically conductive solid food product disposed within said container between and in surface contact with both of said electrodes said food product having an electrical resistance substantially greater than the resistance of said electrodes.

2. The structure of claim 1 in which said electrodes include resilient and electrically conductive moisture-retaining pads in surface contact with opposite ends of said food product.

3. A sealed food package comprising a sealed container formed from a thermal and electrical insulating material, a precooked solid food product of relatively high electrical resistance disposed within said container, and a pair of relatively low resistance strip electrodes disposed within said container and in surface contact with said food product, said electrodes being provided at their ends with a pair of prongs projecting outwardly in spaced relation through a wall portion of said container for insertion into the openings of an electrical receptacle.

4. The structure of claim 3 in which said electrodes include resilient electrolytic pads in direct surface contact with opposite ends of said food.

5. A sealed disposable food package comprising a container having a body defining a food chamber therein and having a closure therefor, and a pair of low resistance strip electrodes in spaced-apart relation within said container, said electrodes having portions thereof projecting through a wall of said container to provide prongs for insertion into an electrical outlet, and an electrically conductive solid food product having an electrical resistance substantially greater than the resistance of said electrodes disposed within said container, with the opposite ends of said food product in surface contact with both of said electrodes.

6. The structure of claim 5 in which said electrodes are provided with electrically conductive cushions to snugly engage the opposite ends of a solid food product when said product is sealed within said container.

7. The structure of claim 5 in which said electrodes are provided with integral circuit-breaking means for interrupting the flow of current therethrough when a food product disposed within said container has been electrically heated to a preselected serving temperature.

References Cited in the file of this patent

UNITED STATES PATENTS

| | | |
|---|---|---|
| 1,970,360 | Courtright | Aug. 14, 1934 |
| 2,039,545 | McCormack | May 5, 1936 |
| 2,094,814 | Pool | Oct. 5, 1937 |
| 2,139,690 | McConnell et al. | Dec. 13, 1938 |
| 2,287,956 | Aff | June 30, 1942 |
| 2,344,373 | Stainbrook | Mar. 14, 1944 |
| 2,474,390 | Aff | June 28, 1949 |
| 2,776,358 | Sturr | Jan. 1, 1957 |
| 2,850,616 | Hatch | Sept. 2, 1958 |
| 2,879,367 | McLean | Mar. 24, 1959 |
| 2,895,405 | Hopkins | July 21, 1959 |